United States Patent
Ishibashi et al.

(10) Patent No.: US 11,754,175 B2
(45) Date of Patent: Sep. 12, 2023

(54) LOCKUP CONTROL DEVICE OF AUTOMATIC TRANSMISSION AND LOCKUP CONTROL METHOD THEREOF

(71) Applicants: JATCO Ltd, Fuji (JP); NISSAN MOTOR CO., LTD., Yokohama (JP)

(72) Inventors: Takeaki Ishibashi, Isehara (JP); Ikuhiro Iwamoto, Yokohama (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/638,708

(22) PCT Filed: Oct. 2, 2020

(86) PCT No.: PCT/JP2020/037631
§ 371 (c)(1),
(2) Date: Feb. 25, 2022

(87) PCT Pub. No.: WO2021/070760
PCT Pub. Date: Apr. 15, 2021

(65) Prior Publication Data
US 2022/0356944 A1  Nov. 10, 2022

(30) Foreign Application Priority Data
Oct. 9, 2019  (JP) .................................. 2019-185709

(51) Int. Cl.
*F16H 61/14* (2006.01)
*F16H 59/18* (2006.01)

(52) U.S. Cl.
CPC ..... *F16H 61/143* (2013.01); *F16H 2059/186* (2013.01); *F16H 2061/145* (2013.01)

(58) Field of Classification Search
CPC ............. F16H 61/143; F16H 2059/186; F16H 2061/145; F16D 48/06
See application file for complete search history.

(56) References Cited

U.S. PATENT DOCUMENTS

| 2010/0235062 A1* | 9/2010 | Moriya | F16H 61/143 701/68 |
| 2017/0203750 A1* | 7/2017 | Kawamoto | B60W 10/08 |
| 2018/0093660 A1* | 4/2018 | Koshiba | B60W 10/02 |
| 2018/0245688 A1* | 8/2018 | Araki | F16H 61/143 |

FOREIGN PATENT DOCUMENTS

JP  2003-254423 A  9/2003

* cited by examiner

*Primary Examiner* — Edwin A Young
(74) *Attorney, Agent, or Firm* — Foley & Lardner LLP

(57) ABSTRACT

The controller starts an output of an engagement instruction of the lockup clutch when a vehicle speed becomes a lockup start vehicle speed under a state where the lockup clutch is disengaged. When the vehicle speed, which is obtained a predetermined time after the output of the engagement instruction is started due to the vehicle speed becoming the lockup start vehicle speed, has reached a predetermined vehicle speed, the controller continues the output of the engagement instruction. When the vehicle speed has not reached the predetermined vehicle speed, the controller stops the output of the engagement instruction and restarts the output of the engagement instruction when the vehicle speed reaches a lockup restart vehicle speed which is set to a vehicle speed higher than the lockup start vehicle speed while the output is stopped.

12 Claims, 7 Drawing Sheets

LOCKUP CONTROL DEVICE OF AUTOMATIC TRANSMISSION AND LOCKUP CONTROL METHOD THEREOF

TECHNICAL FIELD

The present invention relates to a lockup control of an automatic transmission mounted on a vehicle.

BACKGROUND ART

JP 2003-254423A discloses a continuously variable transmission control device that executes a lockup control different from the normal lockup control when the vehicle restarts after the vehicle has stopped at a deceleration equal to or higher than a predetermined value. In the lockup control at the time of restart of the control device, when the travelling state at the time of restart satisfies the predetermined acceleration requirement condition, the control device expands the lockup prohibited region over a predetermined period from the lockup prohibited region due to the normal lockup control, and returns the lockup prohibited region to the lockup prohibited region due to the normal lockup control after the predetermined period elapses. The predetermined period is a period until it is detected that the vehicle speed is equal to or higher than the predetermination vehicle speed.

SUMMARY OF INVENTION

When the acceleration requirement condition is satisfied, the control device only expands the lockup prohibited region to areas larger than the lockup prohibited region due to the normal lockup control until it is detected that the vehicle speed is equal to or higher than the predetermination vehicle speed. Therefore, once the acceleration requirement condition is satisfied in the case of the small travelling resistance, such as when starting on a flat road, etc., the lockup prohibited region is expanded, and it is hard to satisfy the requirement for improving fuel economy due to the early engagement. On the other hand, once the acceleration requirement condition is not satisfied in the case of the large travelling resistance, such as when starting on an ascending road, it becomes the lockup control due to the normal lockup prohibited region. Therefore, there is a problem that the lockup capacity may occur in a lower vehicle speed range than that on a flat road during the lockup engagement, and the driver may feel a sense of discomfort due to the lockup engagement accompanied by a sudden decrease in engine rotation.

The present invention has been developed focusing on the above problem, and the purpose of the present invention is to suppress the sense of discomfort given to the driver during the lockup engagement even when the vehicle speed cannot be increased in, for example, a start scene having a large travelling resistance, while maintaining the energy consumption reduction performance by the lockup engagement.

According to an aspect of the present invention, a lockup control device of an automatic transmission, includes a lockup controller that starts an output of a lockup engagement instruction when a vehicle speed reaches a lockup start vehicle speed under a state where a lockup clutch of a torque converter arranged between a driving source for travelling and a transmission mechanism is disengaged.

The lockup controller includes a determination unit, a lockup engagement continuation unit and a lockup engagement start delay unit.

The determination unit determines whether the vehicle speed, which is obtained a predetermined time after the output of the lockup engagement instruction is started due to the vehicle speed becoming the lockup start vehicle speed, has reached a predetermined determination vehicle speed. The lockup engagement continuation unit continues the output of the lockup engagement instruction when the determination unit determines that the vehicle speed has reached the determination vehicle speed.

The lockup engagement start delay unit stops the output of the lockup engagement instruction when the determination unit determines that the vehicle speed has not reached the determination vehicle speed, and restarts the output of the lockup engagement instruction when the vehicle speed reaches a lockup restart vehicle speed which is set to a vehicle speed higher than the lockup start vehicle speed while the output is stopped.

According to the above aspect, since the above solution is adopted, it is possible to suppress the discomfort given to the driver during the lockup engagement even when the vehicle speed cannot be increased in, for example, a start scene having a large travelling resistance, while maintaining the energy consumption reduction performance by the lockup engagement.

DESCRIPTION OF EMBODIMENTS

Figure 1:
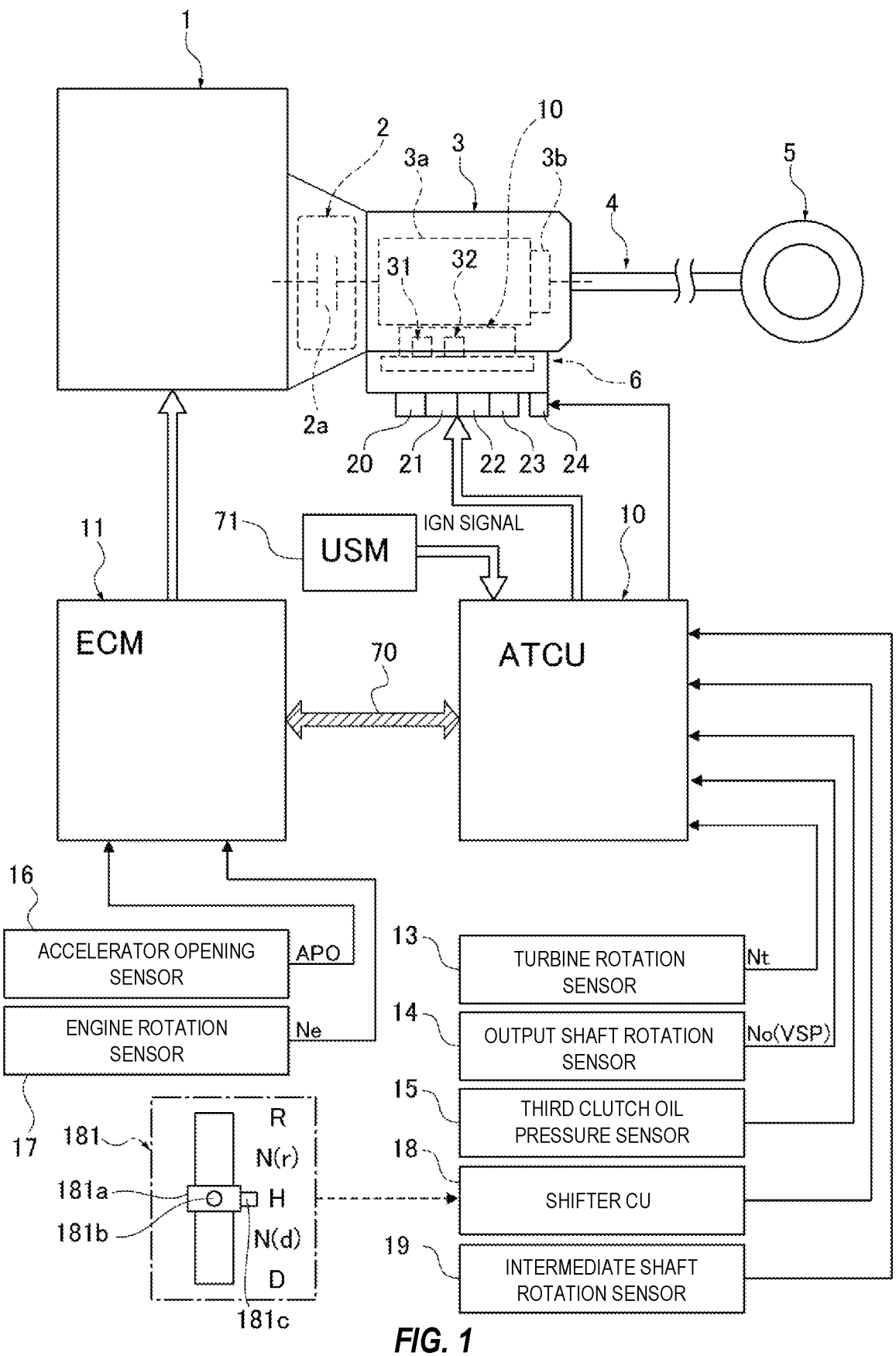
FIG. 1 is a diagram showing an overall system of an engine vehicle equipped with an automatic transmission to which the lockup control device according to the first embodiment has been applied.

Hereinafter, a lockup control device of an automatic transmission according to an embodiment of the present invention is described with reference to the first embodiment shown in the drawings.

First Embodiment

The lockup control device according to the first embodiment is applied to an engine vehicle (an example of a vehicle) equipped with an automatic transmission controlled via shift-by-wire and park-by-wire with 9 forward speeds and 1 reverse speed. Hereinafter, the configuration according to the first embodiment is described separately for the "Overall System Configuration", "Detailed Configuration of the Lockup Control System", and "Lockup Control Process Configuration".

[Overall System Configuration (FIG. 1)]

As shown in FIG. 1, the drive system of the engine vehicle has an engine 1 (driving source for travelling), a torque converter 2, an automatic transmission 3, a propeller shaft 4, and drive wheels 5. A control valve unit 6, which includes spool valves, a hydraulic control circuit, and solenoid valves, etc. for shifting, is attached to the transmission case of the automatic transmission 3.

The torque converter 2 is a fluid coupling having a function of amplifying the input torque from the engine 1 and a function of absorbing the transmission torque fluctuation through slipping. The torque converter 2 includes a lockup clutch 2a that directly connects the crank shaft of the engine 1 and the input shaft of the gear train 3a by clutch engagement.

The automatic transmission 3 includes the gear train 3a and a park gear 3b. The gear train 3a has a plurality of planetary gear trains and friction elements, and achieves 9 forward speeds and 1 reverse speed by changing the combination of engaging elements of the plurality of friction elements. The park gear 3b fixes the output shaft (=transmission output shaft) of the gear train 3a by gear meshing.

The control valve unit 6, as solenoid valves, includes a clutch solenoid 20 provided for each friction element, a line pressure solenoid 21 provided in an oil passage from a hydraulic source, a lubrication solenoid 22, and a lockup solenoid 23 (actuator). All of these solenoid valves have a three-way linear solenoid structure, and perform pressure adjustment operation in response to a control command from the transmission control unit 10.

As shown in FIG. 1, an electronic control system of the engine vehicle has a transmission control unit 10 (abbreviation: "ATCU"), an engine control module 11 (abbreviation: "ECM") and a CAN communication line 70. Here, the transmission control unit 10 is started/stopped in response to an ignition signal from a sensor module unit 71 (abbreviation: "USM").

The transmission control unit 10 is provided in a mechanically and electrically integrated manner on the upper surface position of the control valve unit 6, and has a main board temperature sensor 31 and a sub board temperature sensor 32 on the unit board in a duplexed system while ensuring their independence from each other. That is, the main board temperature sensor 31 and the sub board temperature sensor 32 transmit sensor value information to the transmission control unit 10, but unlike well-known automatic transmission units, they transmit temperature information in the oil pan without being in direct contact with the transmission fluid (ATF). In addition, signals are input to the transmission control unit 10 from a turbine rotation sensor 13, an output shaft rotation sensor 14, and a third clutch oil pressure sensor 15. Further, signals from a shifter control unit 18, an intermediate shaft rotation sensor 19, etc. are input.

The turbine rotation sensor 13 detects a turbine rotation speed (=transmission input shaft rotation speed) of the torque converter 2, and transmits a signal indicating the turbine rotation speed Nt to the transmission control unit 10. The output shaft rotation sensor 14 detects an output shaft rotation speed of the automatic transmission 3, and transmits a signal indicating the output shaft rotation speed No (=vehicle speed VSP) to the transmission control unit 10. The third clutch oil pressure sensor 15 detects a clutch oil pressure of a third clutch K3, and transmits a signal indicating a third clutch oil pressure PK3 to the transmission control unit 10.

The shifter control unit 18 determines the range position selected by a driver's select operation on a shifter 181, and transmits a range position signal to the transmission control unit 10. Further, the shifter 181 has a momentary structure, and has a P range button 181b on top of an operation unit 181a and an unlock button 181c (only when N→R) on one side of the operation unit 181a. Further, the range positions include an H range (home range), an R range (reverse range), a D range (drive range), and N(d), N(r) (neutral range). The intermediate shaft rotation sensor 19 detects a rotation speed of an intermediate shaft (intermediate shaft=rotating member connected to the first carrier C1), and transmits a signal indicating the intermediate shaft rotation speed Nint to the transmission control unit 10.

The transmission control unit 10 performs lockup control through the disengagement/slip-engagement/engagement of the lockup clutch 2a. Further, by monitoring changes in operating points (VSP, APO) by the vehicle speed VSP and the accelerator opening APO on an unillustrated shift map, shift control is performed using the following basic shift patterns:
1. Auto-upshift (by an increase in the vehicle speed in a state with the accelerator opening maintained)
2. Foot release upshift (by an accelerator foot release operation)
3. Foot return upshift (by an accelerator return operation)
4. Power-on downshift (by a vehicle speed decrease with the accelerator opening maintained)
5. Small opening sudden pressing downshift (by a small accelerator operation amount)
6. Large opening sudden pressing downshift (by a large accelerator operation amount: "kickdown")
7. Slow pressing downshift (by a slow accelerator pressing operation and an increase in the vehicle speed)
8. Coast downshift (by a vehicle speed decrease with an accelerator foot release operation).

Signals are input to the engine control module 11 from an accelerator opening sensor 16, an engine rotation sensor 17, etc.

The accelerator opening sensor 16 detects an accelerator opening due to the accelerator operation by the driver, and transmits a signal indicating the accelerator opening APO to the engine control module 11. The engine rotation sensor 17 detects a rotation speed of the engine 1, and transmits a signal indicating the engine rotation speed Ne to the engine control module 11.

The engine control module 11, in addition to various controls on the engine itself, performs engine torque limit control, etc. through a cooperative control with the transmission control unit 10. Since the engine control module 11 is connected to the transmission control unit 10 via a CAN communication line 70 by which information can be exchanged in both directions, when an information request is input to the engine control module 11 from the transmission control unit 10, the engine control module 11 outputs information on the accelerator opening APO or on the engine rotation speed Ne to the transmission control unit 10. Further, the engine control module 11 outputs information on the engine torque Te or the turbine torque Tt calculated by estimation to the transmission control unit 10. Moreover, when an engine torque limit request according to the upper limit torque is input to the engine control module 11 from the transmission control unit 10, the engine torque limit control, in which the engine torque is limited by a predetermined upper limit torque, is executed by the engine control module 11.

[Detailed Configuration of the Lockup Control System (FIG. 2~FIG. 5)]

Figure 2:
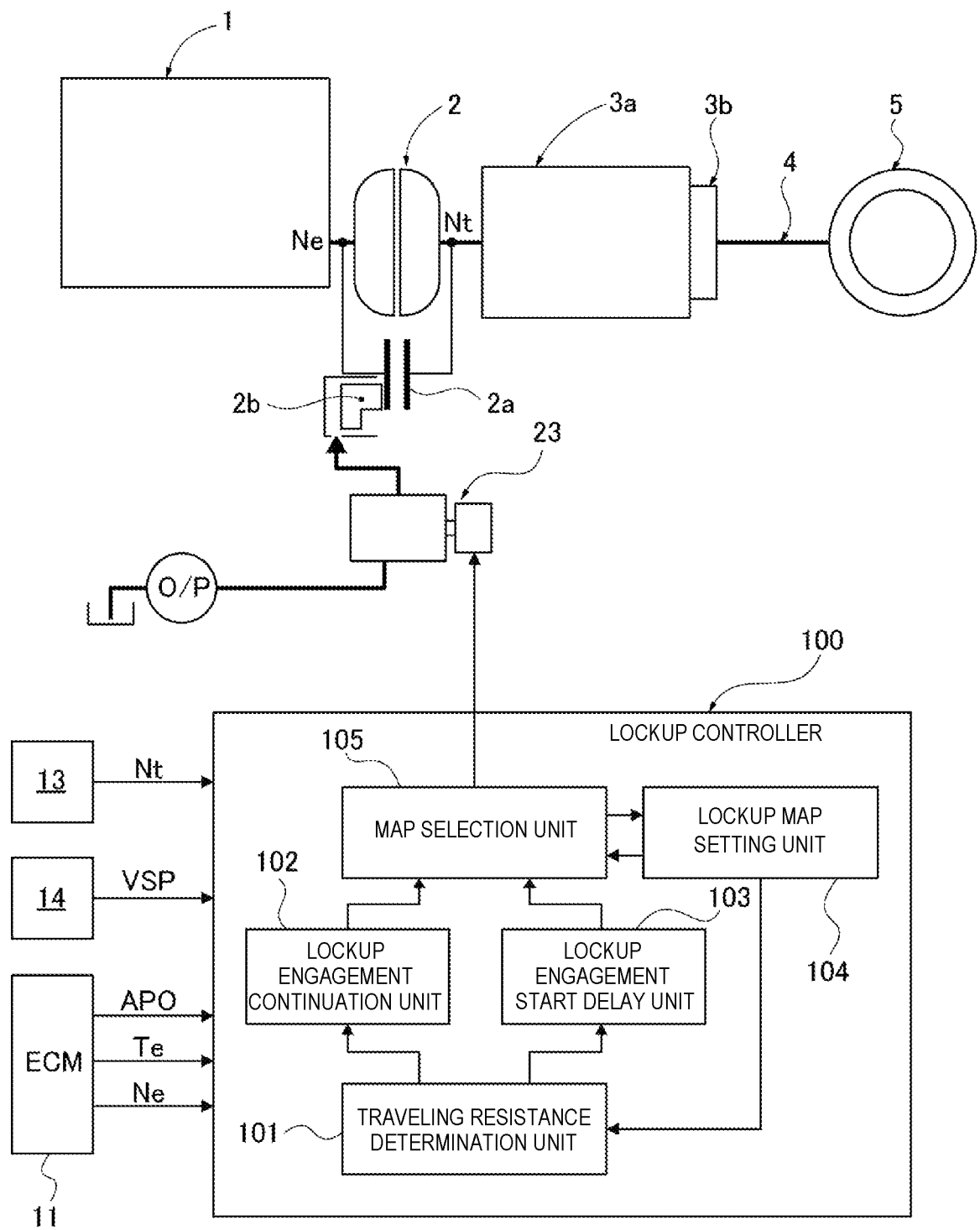
FIG. 2 is a detailed configuration diagram showing a lockup control system of the automatic transmission.

As shown in FIG. 2, the lockup control system of the automatic transmission 3 has the lockup clutch 2a, the lockup controller 100, and the lockup solenoid 23 (actuator).

The lockup clutch 2a is included in the torque converter 2 arranged between the engine 1 (driving source for travelling) and the gear train 3a (transmission mechanism), and is engaged by a lockup piston 2b that strokes due to the supply of lockup hydraulic pressure. Further, the lockup hydraulic pressure is adjusted by the lockup solenoid 23 according to lockup control instruction (engagement instruction/disengagement instruction) from the lockup controller 100.

The lockup controller 100 monitors changes in the operating points (VSP, APO) according to the vehicle speed VSP and the accelerator opening APO on the lockup map to be described later, and outputs a lockup control instruction to the lockup solenoid 23. Information such as the turbine rotation speed Nt from turbine rotation sensor 13, the vehicle speed VSP from the output shaft rotation sensor 14, the accelerator opening APO, the engine torque Te, and the engine rotation speed Ne from the engine control module 11, etc. is input to the lockup controller 100.

When starting in the first-speed gear in the D range, in the lockup basic control, the lockup controller 100 starts the output of a lockup engagement instruction to the lockup solenoid 23 when the vehicle speed VSP reaches the lockup start vehicle speed A set in the low vehicle speed range in the lockup disengaging state. A lockup convergence control is then performed to converge the actual slip amount toward zero according to the target slip rotation change rate in which the descending gradient becomes larger as the clutch differential rotation (rotation speed difference between the engine rotation speed Ne and the turbine rotation speed Nt) is larger. After the actual slip amount converges to zero due to the lockup convergence control, a zero slip control that keeps the slip amount of the lockup clutch 2a at zero (engaged state) is continued, instead of making the lockup clutch 2a into a completely engaged state that does not allow slip against the transmission torque fluctuation. Here, the "zero slip control" means a control that matches the engaging torque capacity of the lockup clutch 2a with the engine torque Te, which is the input torque, and thereby transmits a torque whose upper limit is the engine torque Te in the clutch engaged state.

That is, once the vehicle speed VSP reaches the lockup start vehicle speed A in the low vehicle speed range when starting in the first-speed gear in the D range, the clutch engagement is started, and once the clutch is in an engaged state, zero slip control is continued regardless of the upshift or downshift in the gear train 3a. In this way, the lockup basic control is a control that prioritizes the fuel efficiency performance of the engine 1. A shift shock is suppressed by the slip (clutch slip) under the zero slip control to the shifting in the gear train 3a where the input torque to the lockup clutch 2a fluctuates, instead of lockup disengaging.

As shown in FIG. 2, the lockup controller 100 has a traveling resistance determination unit 101 (determination unit), a lockup engagement continuation unit 102, a lockup engagement start delay unit 103, a lockup map setting unit 104, and a map selection unit 105.

The traveling resistance determination unit 101 determines whether the vehicle speed VSP(t), which is obtained a predetermined time T after the output of the lockup engagement instruction is started due to the vehicle speed VSP becoming the lockup start vehicle speed A, has reached the predetermined determination vehicle speed B, thereby determining the magnitude of the travelling resistance.

Figure 3:
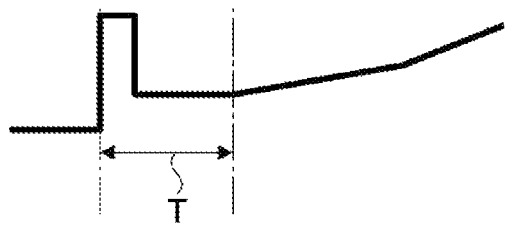
FIG. 3 is a lockup instruction pressure characteristic diagram showing the setting of a predetermined time in a traveling resistance determination unit.

Here, the "predetermined time T" is set to a time that is the timing immediately before the lockup capacity is generated by the lockup clutch 2a. For example, as shown in FIG. 3, the "predetermined time T" is set to a time during which the lockup capacity does not occur even when the piston stroke for shortening the plate spacing of the lockup clutch 2a is fast. Further, the information on the time when the lockup capacity starts to be generated by the lockup clutch 2a is acquired as a learning result by the learning control. Therefore, when the learning time during which the lockup capacity occurs is changed by, for example, the wear of the clutch plate due to long-term use, the "predetermined time T" is also changed accordingly.

Figure 4:
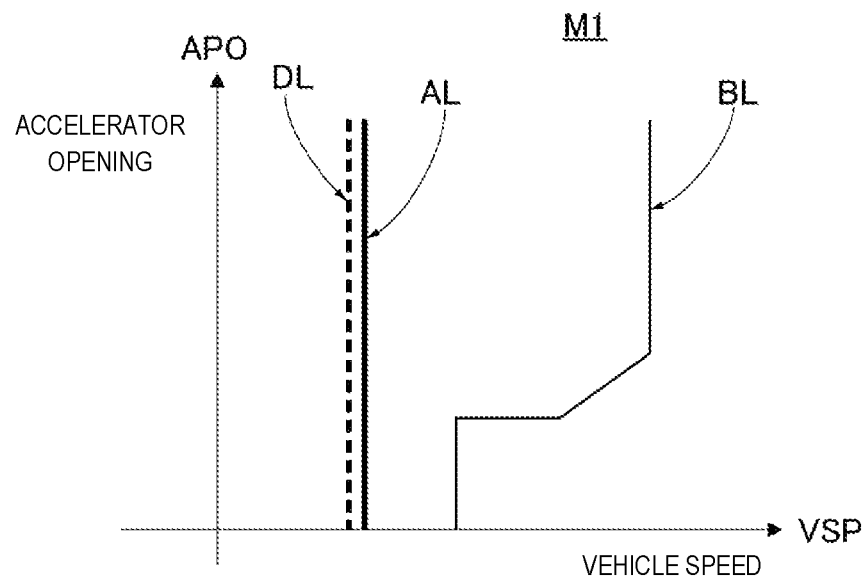
FIG. 4 is a diagram showing a first lockup map set in a lockup map setting unit.

Further, the "determination vehicle speed B" is set to a low vehicle speed value when the accelerator opening APO is in the low opening range and a high vehicle speed value when the accelerator opening APO is in the high opening range on the basis of the acceleration characteristics with reference to the travelling resistance on flat roads, as shown in the determination vehicle speed line BL in the first lockup map M1 of FIG. 4.

When traveling resistance determination unit 101 determines that the vehicle speed VSP has reached the determination vehicle speed B, the lockup engagement continuation unit 102 continues to output the lockup engagement instruction. That is, immediately after the vehicle speed VSP reaches the determination vehicle speed B, the clutch differential rotation converges to zero, and the lockup clutch 2a shifts to the engaged state.

When the traveling resistance determination unit 101 determines that vehicle speed VSP has not reached the determination vehicle speed B, the lockup engagement start delay unit 103 stops the output of the lockup engagement instruction and returns the lockup clutch 2a to the disengaged state without shifting to the engaged state. When the vehicle speed VSP reaches the lockup restart vehicle speed C during the output stop, the output of the lockup engagement instruction is restarted. Here, the "lockup restart vehicle speed C" is set to the vehicle speed region value of the determination vehicle speed B.

The lockup map setting unit 104 sets the first lockup map M1 (FIG. 4) and the second lockup map M2 (FIG. 5) based on a two-dimensional coordinate plane of the vehicle speed VSP and the accelerator opening APO. Further, the lockup map is not limited to the characteristic line map in the two-dimensional coordinate as shown in FIGS. 4, 5, and of course may be given by a numerical table map or an arithmetic expression map.

As shown in FIG. 4, the first lockup map M1 has a first lockup start vehicle speed line AL by which the output of the lockup engagement instruction starts, a determination vehicle speed line BL, and a first lockup release vehicle speed line DL. Further, the "first lockup release vehicle speed line DL" is a vehicle speed line on the lower speed side by the amount of vehicle speed hysteresis from the first lockup start vehicle speed line AL.

Figure 5:
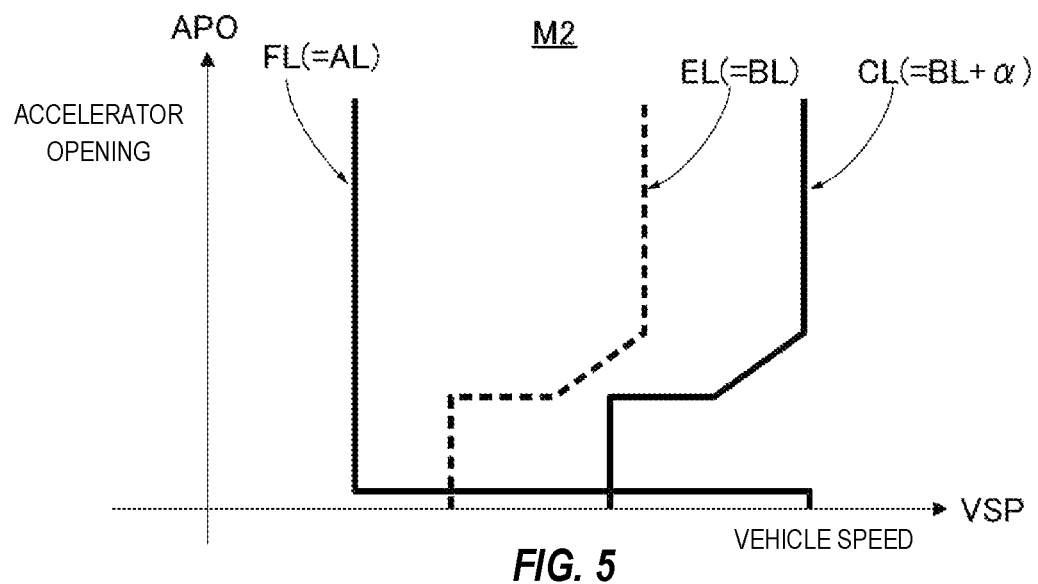
FIG. 5 is a diagram showing a second lockup map set in the lockup map setting unit.

As shown in FIG. 5, the second lockup map M2 has a second lockup restart vehicle speed line CL by which the output of the lockup engagement instruction restarts, a second lockup release vehicle speed line EL(=BL) with the same settings as the determination vehicle speed line BL, and a map switching line FL.

Here, the "second lockup restart vehicle speed line CL" is set on the higher vehicle speed side by the amount of vehicle speed hysteresis α from the second lockup release vehicle speed line EL (CL=BL+α). Further, the "map switching line FL" is set to be the same vehicle speed line as the first lockup start vehicle speed line AL in the opening range other than the coast opening range of the accelerator opening APO. Then, it is set to extend to the higher vehicle speed side of the second lockup restart vehicle speed line CL in the coast opening range. That is, the determination vehicle speed line BL, the second lockup release vehicle speed line EL, the second lockup restart vehicle speed line CL, and the map switching line FL have a vehicle speed axis for each accelerator opening axis.

The map selection unit 105 selects the first lockup map M1 in the initial state in which the lockup clutch 2a is disengaged. Then, when a continuation command is input from the lockup engagement continuation unit 102, the selection of the first lockup map M1 is maintained. On the other hand, when an engagement start delay command is input from the lockup engagement start delay unit 103, the second lockup map M2 is selected by map-switching. In addition, while the second lockup map M2 is being selected, once the operating points (VSP, APO) according to the vehicle speed VSP and the accelerator opening APO crosses the map switching line FL, the first lockup map M1 is selected by map-switching. That is, while the second lockup map M2 is being selected, not only when the vehicle speed VSP drops to the lockup release range, but also when the accelerator is released, the second lockup map M2 is switched to the first lockup map M1.

[Lockup Control Process Configuration (FIG. 6)]

Figure 6:
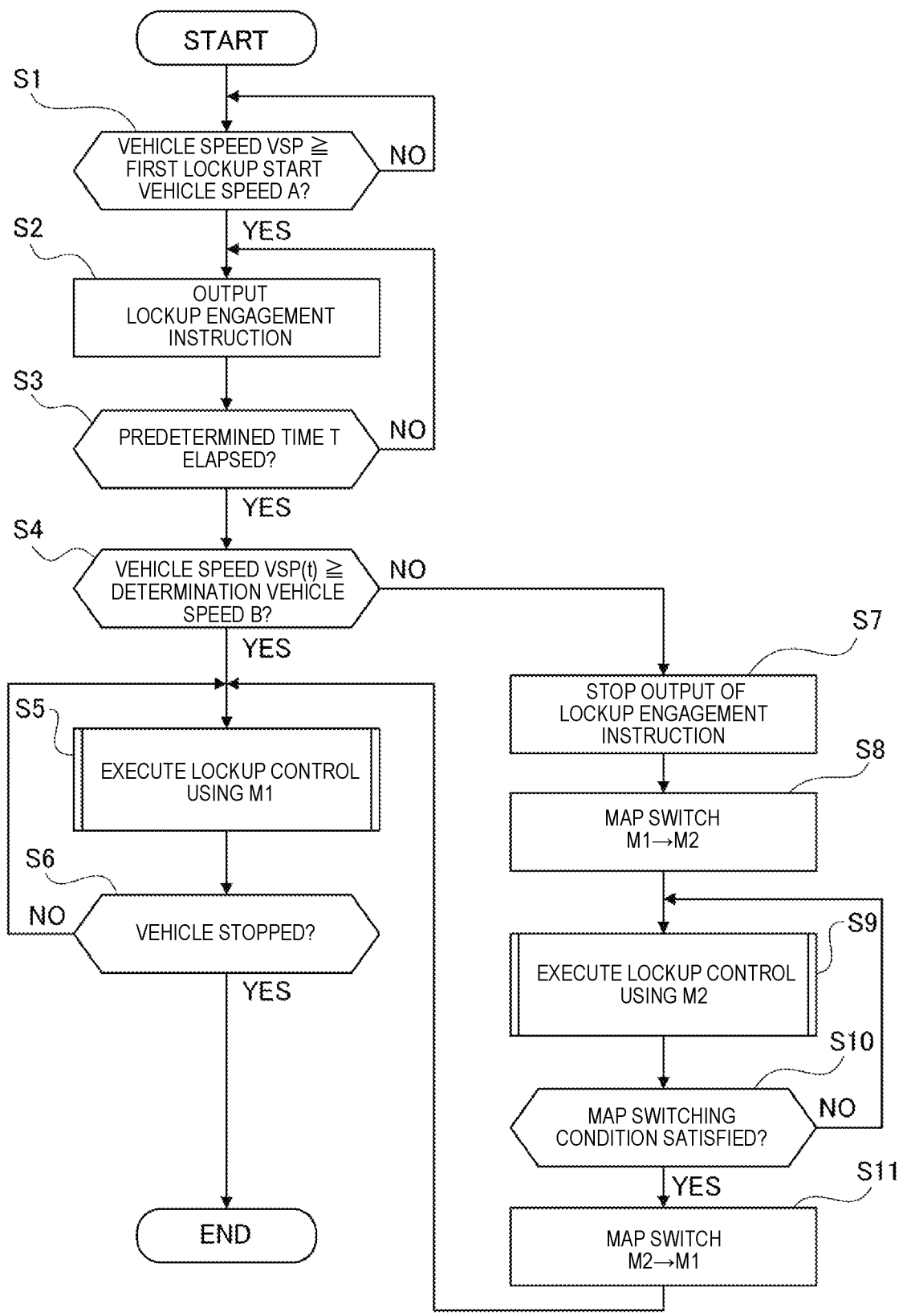
FIG. 6 is a flowchart showing the flow of the lockup control process executed by a lockup controller.

The lockup control process shown in FIG. 6 starts when the vehicle is stopped with the first lockup map M1 selected in the D range and the lockup clutch 2a being in the disengaged state.

In step S1, following the processing start, it is determined whether or not the vehicle speed VSP has reached the first lockup start vehicle speed A. The process proceeds to step S2 in the case of YES (VSP first lockup start vehicle speed A), and the determination in step S1 is repeated in the case of NO (VSP<first lockup start vehicle speed A).

In step S2, following the determination in S1 that VSP first lockup start vehicle speed A is established or the determination in step S3 that the predetermined time T has not passed, the lockup engagement instruction is output and the process proceeds to step S3.

In step S3, following the output of the lockup engagement instruction in S2, it is determined whether or not the elapsed time from the start of the output of the lockup engagement instruction has passed the predetermined time T. The process proceeds to step S4 in the case of YES (predetermined time T has passed), and returns to step S2 in the case of NO (predetermined time T has not passed).

In step S4, following the determination in S3 that the predetermined time T has passed, it is determined whether or not the vehicle speed VSP(t) read at the time when the predetermined time T has passed is equal to or higher than the determination vehicle speed B. The process proceeds to step S5 in the case of YES (VSP(t)≥determination vehicle speed B), and proceeds to step S7 in the case of NO (VSP(t)<determination vehicle speed B).

Instep S5, following the determination in S4 that VSP(t) determination vehicle speed B is established or the determination in S6 that the vehicle is traveling, or the map switching along M2→M1 in S11, the selection of the first lockup map M1 is maintained, the lockup control using the first lockup map M1 is executed, and the process proceeds to step S6.

Here, in the lockup control using the first lockup map M1, when the operating points (VSP, APO) crosses the first lockup start vehicle speed line AL due to the increase in the vehicle speed VSP, a lockup start instruction is output. After the output of the lockup start instruction, when the clutch differential rotation converges to zero due to the lockup convergence control, the zero slip control is maintained thereafter. Then, when the operating points (VSP, APO) crosses the first lockup release vehicle speed line DL due to the decrease in the vehicle speed VSP, the lockup release instruction is output. When the process proceeds from S4 to S5, the lockup start instruction has already been output in S2.

In step S6, following the execution of the lockup control using M1 in S5, it is determined whether or not the vehicle is stopped. The process proceeds to the end in the case of YES (stopped), and returns to step S5 in the case of NO (travelling).

In step S7, following the determination in S4 that VSP (t)<determination vehicle speed B is established, the output of the lockup engagement instruction is stopped, and the process proceeds to step S8.

In step S8, following the stop of the output of the lockup engagement instruction in S7, the first lockup map M1 selected so far is switched to the second lockup map M2, and the process proceeds to step S9.

In step S9, following the map switching along M1→M2 in S8 or the determination that the map switching condition is not satisfied in S10, the lockup control using the second lockup map M2 after switching is executed, and the process proceeds to step S10.

Here, in the lockup control using the second lockup map M2, when the operating points (VSP, APO) crosses the second lockup restart vehicle speed line CL due to the increase in the vehicle speed VSP, a lockup restart instruction is output. After the output of the lockup restart instruction, when the clutch differential rotation converges to zero due to the slip engagement control, the zero slip control is maintained thereafter. Then, when the operating points (VSP, APO) crosses the second lockup release vehicle speed line EL due to the decrease in the vehicle speed VSP, the lockup release instruction is output.

In step S10, following the execution of the lockup control using M2 in S9, it is determined whether or not the map switching condition is satisfied. The process proceeds to step S11 in the case of YES (map switching condition is satisfied), and returns to step S9 in the case of NO (map switching condition is not satisfied).

Here, it is determined that the map switching condition is satisfied when the operating points (VSP, APO) crosses the map switching line FL due to the accelerator foot release operation or due to the decrease in the vehicle speed VSP on the second lockup map M2.

In step S11, following the determination in S10 that the map switching condition is satisfied, the selected second lockup map M2 is switched to the first lockup map M1, and the process proceeds to step S5.

Next, the technical problems solved by the present embodiment will be described with reference to comparative examples. Then, the actions of the first embodiment are described separately for "lockup control action according to the travelling resistance" and "switching control action of a lockup map".

Figure 7:
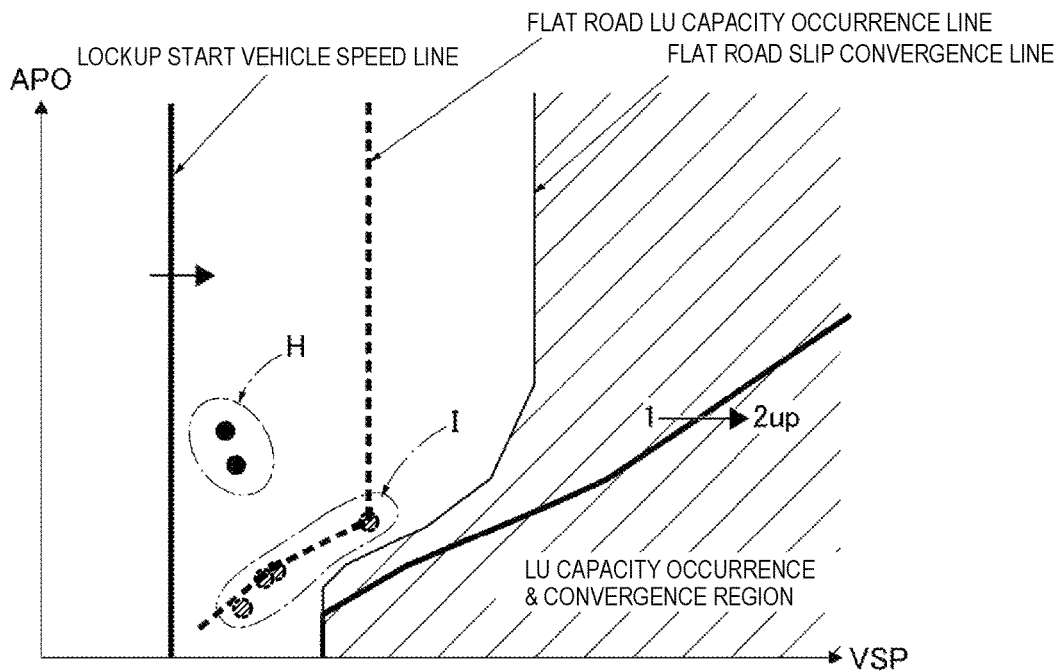
FIG. 7 is a comparison diagram of the occurrence points of the lockup capacity after the start of the lockup engagement on an ascending road and a flat road.

FIG. 7 is a comparative example in which the lockup map with a set lockup start vehicle speed line is used, and the lockup engagement instruction is output when the vehicle speed crosses the lockup start vehicle speed line.

Figure 8:
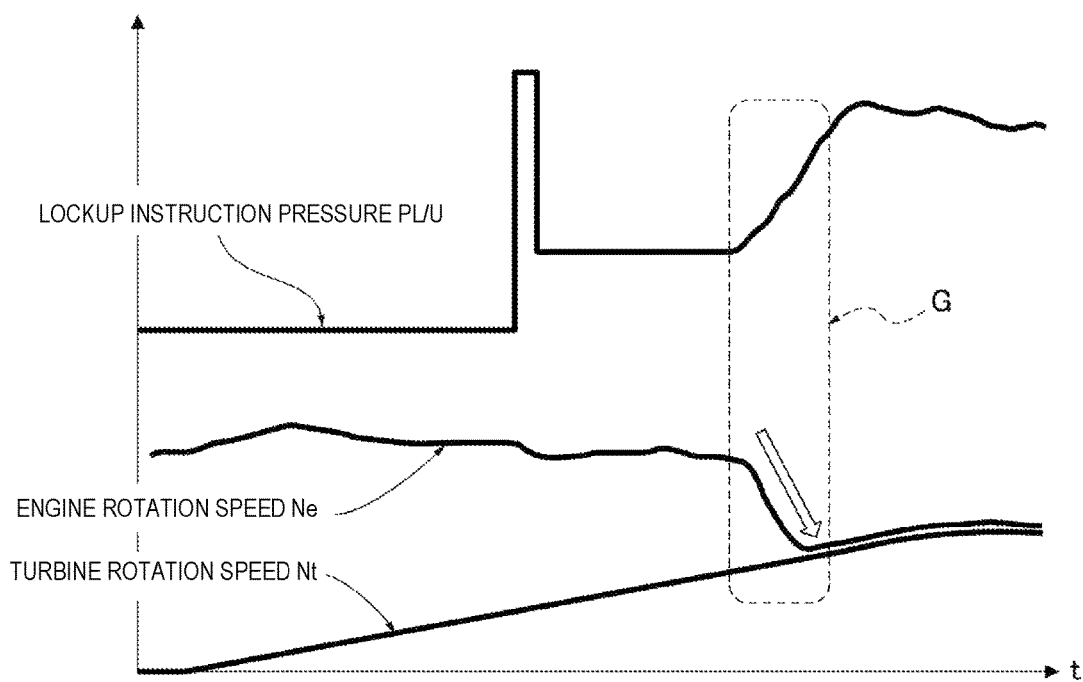
FIG. 8 is a time chart showing a problem at the time of the lockup engagement on a slope road under off-road conditions in the comparison example.

In this comparative example, in a case where the lockup clutch is engaged at the time of starting on an ascending road having a large travelling resistance, during the lockup engagement, as shown in the in-frame characteristics of arrow G in FIG. 8, once the lockup capacity starts to occur, the engine rotation speed Ne suddenly drops to the turbine rotation speed Nt. Then, a problem is pointed out that the lockup engagement due to the sudden decrease in the engine rotation speed Ne causes a "lockup shock" or a "hesitation" that gives the driver a sense of discomfort. Further, the "lockup shock" refers to a phenomenon in which a change in vehicle behavior is caused by a sudden engagement of the lockup clutch. The "hesitation" is the sluggishness of the engine, and refers to a phenomenon in which when the lockup clutch is engaged, the torque amplification effect of the torque converter is lost, and the vehicle does not accelerate even if the accelerator is further depressed.

Therefore, the present inventors, et al., in order to clarify the cause of giving the driver a sense of discomfort during the lockup engagement, have experimented on where the operating point H, at which the lockup capacity occurs at the time of starting on an ascending road, and the operating point I, at which the lockup capacity occurs at the time of starting on a flat road, are located. According to this experimental result, as shown in FIG. 7, it is found that even if the lockup start vehicle speed is the same, the lockup capacity occurs in a lower vehicle speed range at the operating points H where the lockup capacity occurs at the time of starting on an ascending road as compared to at the operating points I where the lockup capacity occurs at the time of starting on a flat road.

Then, when the mechanism that the engine rotation speed Ne suddenly decreases once the lockup capacity starts to occur is analyzed, it is found that the mechanism is based on the following mechanisms (a), (b), and (c).

(a) On an ascending road, acceleration decreases even with the same accelerator opening, and transition from the torque converter state to the slip engagement state is executed in the low turbine rotation region.

(b) The target slip rotation change rate at the time of transition to the slip engagement state becomes large with a negative gradient in the low turbine rotation range where the clutch differential rotation becomes large in order to suppress clutch heat occurrence.

(c) When a slip engagement instruction is given under a state where the clutch differential rotation is large, the lockup instruction pressure after the lockup capacity starts to occur rises sharply, and the slip amount (=clutch differential rotation) converges at once.

On the basis of the verification results, the present inventors, et al. have set goals (requirements) for lockup control as follows.

On a flat road, the lockup convergence can be performed at the same timing as that of the background technology.

When the travelling resistance is large, such as on an ascending road, the lockup capacity does not occur in the low vehicle speed range where lockup is not desired.

Even when the travelling resistance is large, the lockup convergence can be performed before reaching the vehicle speed at which lockup is desired.

The present inventors, et al. focus on the following points with respect to the above goals (requirements).

(A) Even if the lockup engagement instruction is started due to a vehicle speed becoming the lockup start vehicle speed, no lockup capacity occurs in the lockup preparation phase where the clutch gap is closed by the piston stroke. Therefore, it is possible to determine the magnitude of the travelling resistance by using the lockup preparation phase.

(B) In a case of determining that the travelling resistance is small, when the output of the lockup engagement instruction is continued, lockup convergence can be performed at the same timing as the background technology.

(C) In a case of determining that the travelling resistance is large, when the output of the lockup engagement instruction is stopped, no lockup capacity occurs in the low vehicle speed range where lockup is not desired.

(D) In a case of determining that the travelling resistance is large, when the lockup restart vehicle speed is set, it is possible to perform the lockup convergence in the vehicle speed range where lockup is desired.

On the basis of the above focus points, the present disclosure includes the lockup controller 100 which starts the output of the lockup engagement instruction when the vehicle speed VSP reaches the lockup start vehicle speed A under the state where the lockup clutch 2a of the torque converter 2 arranged between the engine 1 and the gear train 3a is disengaged. The lockup controller 100 has the traveling resistance determination unit 101, the lockup engagement continuation unit 102, and the lockup engagement start delay unit 103. The traveling resistance determination unit 101 determines whether the vehicle speed VSP(t), which is obtained a predetermined time T after the output of the lockup engagement instruction is started due to the vehicle speed VSP becoming the lockup start vehicle speed A, has reached the predetermined determination vehicle speed B. When the traveling resistance determination unit 101 determines that the vehicle speed VSP(t) has reached the determination vehicle speed B, the lockup engagement continuation unit 102 continues to output the lockup engagement instruction. The lockup engagement start delay unit 103 stops the output of the lockup engagement instruction when the traveling resistance determination unit 101 determines that the vehicle speed VSP(t) does not reach the determination vehicle speed B, and restarts the output of the lockup engagement instruction when the vehicle speed VSP reaches the lockup restart vehicle speed C which is set to a vehicle speed higher than the lockup start vehicle speed A during the output stop.

That is, the magnitude of the travelling resistance is determined by whether or not the vehicle speed VSP(t) has reached the determination vehicle speed B after the predetermined time T has elapsed from the start of the output of the lockup engagement instruction. Therefore, while setting the method which is incorporated in a part of the lockup engagement control, it is possible to accurately determine the magnitude of the travelling resistance, and thereby satisfy the goal (requirement) of (A) above.

Then, when the vehicle speed VSP(t) has reached the determination vehicle speed B, since the output of the lockup engagement instruction is continued on the basis of the determination that the travelling resistance is small, the goal (requirement) of (B) above is satisfied. The output of the lockup engagement instruction is stopped on the basis of the determination that the travelling resistance is large when the vehicle speed VSP(t) does not reach the determination vehicle speed B, and thus, the goal (requirement) of (C) above is satisfied. When the vehicle speed VSP reaches the lockup restart vehicle speed C during the output stop of the lockup engagement instruction, the output of the lockup engagement instruction is restarted, and thus, the goal (requirement) of (D) above is satisfied.

After it is determined that the travelling resistance is large and the output of the lockup engagement instruction is stopped, instead of maintaining the lockup disengaged state as it is, a control is performed to restart the engagement of the lockup clutch 2a. Therefore, fuel saving performance due to the lockup engagement is maintained.

When it is determined that the travelling resistance is large, the output of the lockup engagement instruction is stopped, and thus, lockup sudden engagement is avoided at a vehicle speed lower than the vehicle speed at which convergence is desired at the time of starting with a large travelling resistance. Further, during the output stop, the restart of the lockup engagement instruction is delayed until the vehicle speed VSP reaches the lockup restart vehicle speed C, and thus, the lockup engagement instruction is restarted after the clutch differential rotation becomes small due to the increase in turbine rotation speed Nt accompanying the increase in vehicle speed. Therefore, even when the vehicle speed cannot be increased in, for example, a start scene having a large travelling resistance, the occurrence of the lockup shock and the occurrence of the hesitation are prevented during the lockup engagement.

As a result, it is possible to suppress the discomfort given to the driver by preventing the occurrence of the lockup shock and the occurrence of the hesitation during the lockup engagement even when the vehicle speed cannot be increased due to, for example, a start scene having a large travelling resistance, while maintaining the fuel saving performance due to the lockup engagement.

Next, the determination of the travelling resistance is described. For example, as a method for determining the magnitude of travelling resistance, there is known a prefetching determination method for estimating the vehicle speed at the time of the lockup capacity occurrence from the ascending gradient of the engine rotation speed, and determines whether or not the acceleration is insufficient. However, in the prefetching determination method, the timing of obtaining the ascending gradient of the engine rotation speed is the start of the increase in the engine rotation speed immediately after starting due to the accelerator depression operation, and thus, the engine torque also increases during the accelerator operation, and the prediction accuracy of the travelling resistance becomes low.

On the other hand, the magnitude of the travelling resistance is determined by the actual vehicle speed determination method that precisely checks the vehicle speed VSP(t) after the predetermined time T has elapsed from the start of the output of the lockup engagement instruction. Therefore, the actual vehicle speed determination method can determine the magnitude of the travelling resistance with higher accuracy than the prefetching determination method based on the vehicle speed estimation.

In the actual vehicle speed determination method, the "predetermined time T" is set to a time that is the timing immediately before the lockup capacity occurs by the lockup clutch 2a. Therefore, since the vehicle speed VSP(t) is precisely checked when the lockup capacity starts to occur, it is possible to clearly grasp whether or not the vehicle speed VSP(t) is fitted in the target vehicle speed range as the vehicle speed at which the lockup capacity starts to occur. Therefore, when it is determined that the vehicle speed VSP(t) has not reached the determination vehicle speed B, it is possible to prevent the occurrence of the engine rotation drop and prevent the return operation of the lockup piston 2b from being affected, by stopping the output of the lockup engagement instruction before the occurrence of the lockup capacity.

In addition, in the actual vehicle speed determination method, on the basis of the acceleration characteristics with reference to the travelling resistance on a flat road, the "determination vehicle speed B" is set to a low vehicle speed value when the accelerator opening APO is in the low opening range and a high vehicle speed value when the accelerator opening APO is in the high opening range. Therefore, it is possible to determine whether the vehicle is starting on a flat road or on an ascending road on the basis that whether the vehicle speed VSP(t) has reached the determination vehicle speed B while responding to the difference in acceleration characteristics due to the accelerator opening APO.

[Lockup Control Action According To Travelling Resistance (FIG. 6, FIG. 9, FIG. 10)]

When starting with the lockup clutch 2a disengaged, once the vehicle speed VSP becomes equal to or higher than the first lockup start vehicle speed A, the process proceeds along S1→S2→S3 in the flowchart of FIG. 6. In S2, the lockup engagement instruction is output, and in S3, it is determined whether or not the elapsed time from the start of the output of the lockup engagement instruction has reached the predetermined time T. When the elapsed time from the start of the output of the lockup engagement instruction has reached the predetermined time T, the process proceeds from S3 to S4, and in S4, it is determined whether or not the vehicle speed VSP(t) read when the predetermined time T has elapsed is equal to or higher than the determination vehicle speed B.

In S4, when it is determined that VSP(t)≥determination vehicle speed B is established, the process proceeds from S4 to S5→S6. In S5, the selection of the first lockup map M1 is maintained, and the lockup control using the first lockup map M1 is executed. Whether the vehicle is stopped is determined in S6, when it is determined that the vehicle is travelling, the flow along S5→S6 is repeated, and the execution of lockup control using the first lockup map M1 is continued. Then, when it is determined in S6 that the vehicle is stopped, the process proceeds from S6 to the end.

Figure 9:
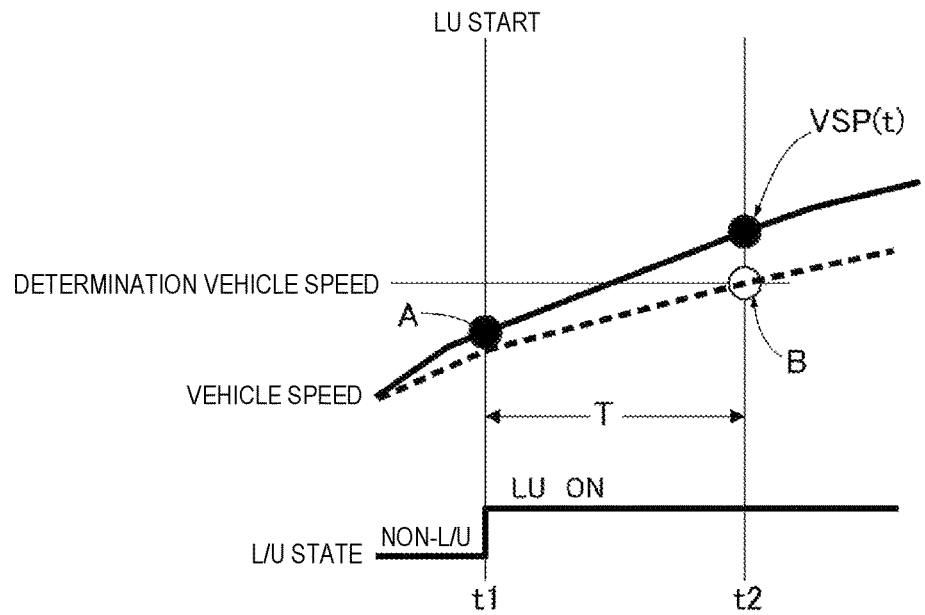
FIG. 9 is a time chart showing lockup control action when it is determined that the travelling resistance is small.

Therefore, as shown in FIG. 9, after starting, the lockup start instruction is output at the time t1 when the operating points (VSP, APO) becomes equal to or higher than the first lockup start vehicle speed A due to the increase in the vehicle speed VSP. As a result, the lockup state shifts from the non-lockup state to the lockup on state. When the vehicle speed VSP(t) is equal to or higher than the determination vehicle speed B at the time t2 when the predetermined time T has elapsed from the time t1 at which the lockup start instruction is output, it is determined that the travelling resistance is small and the lockup control is continued as it is. That is, when the clutch differential rotation converges to zero by the lockup convergence control immediately after the time t2, the zero slip control is maintained thereafter.

On the other hand, when it is determined in S4 that VSP(t)<determination vehicle speed B is established, the process proceeds from S4 to S7→S8→S9→S10. In S7, the output of the lockup engagement instruction is stopped, and in S8, the first lockup map M1 selected so far is switched to the second lockup map M2. In S9, the lockup control using the second lockup map M2 after switching is executed. Whether the map switching condition is satisfied is determined in S10, and when it is determined that the map switching condition is not satisfied, the flow along S9→S10 is repeated, and the execution of the lockup control using the second lockup map M2 is continued.

When it is determined in S10 that the map switching condition is satisfied, the process proceeds from S10 to S11→S5, and in S11, the selected second lockup map M2 is switched to the first lockup map M1. Then, in S5, the lockup control using the first lockup map M1 is executed.

Figure 10:
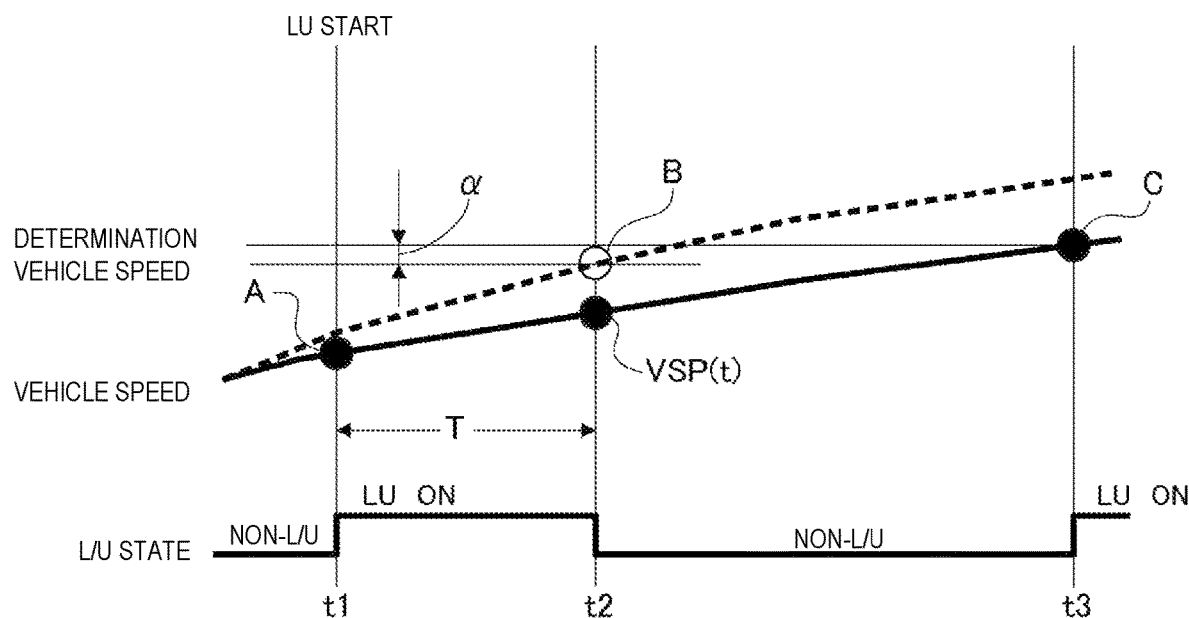
FIG. 10 is a time chart showing lockup control action when it is determined that the travelling resistance is large.

Therefore, as shown in FIG. 10, when the vehicle speed VSP(t) is smaller than the determination vehicle speed B at the time t2 when the predetermined time T has elapsed from the time t1 at which the lockup start instruction is output, it is determined that the travelling resistance is large, and the output of the lockup engagement instruction is stopped, and thereby the lockup state shifts from the lockup on state to the non-lockup state. When the vehicle speed VSP(t) becomes equal to or higher than the second lockup restart vehicle speed C(=B+a) at a time t3 due to the increase in the vehicle speed VSP from the time t2, the lockup start instruction is re-output. As a result, the lockup state shifts from the non-lockup state to the lockup on state.

Here, the second lockup restart vehicle speed C is set to the vehicle speed region value of the determination vehicle speed B. Therefore, in the case of the large travelling resistance, such as when starting on an ascending road, the vehicle speed VSP is in the vehicle speed range where lockup is desired, and the lockup convergence is possible at the same vehicle speed timing as when the travelling resistance is small at the time of starting on a flat road, etc. Further, in the first embodiment, in consideration of the prevention of vehicle speed hunting to be described later, the second lockup restart vehicle speed C is set to the higher vehicle speed side of the determination vehicle speed B by the amount of the vehicle speed hysteresis α. However, when the second lockup release vehicle speed E is set to the lower vehicle speed side of the determination vehicle speed B, the second lockup restart vehicle speed C may be set to the vehicle speed value matching the determination vehicle speed B, or the lower vehicle speed side of the determination vehicle speed B.

[Lockup Map Switching Control Action (FIG. 11)]

As described above, when the vehicle speed VSP(t) is equal to or higher than the determination vehicle speed B at the time t2 when the predetermined time T has elapsed from the time t1 at which the lockup start instruction is output, it is determined that the travelling resistance is small and the selection of the first lockup map M1 is maintained.

Figure 11:
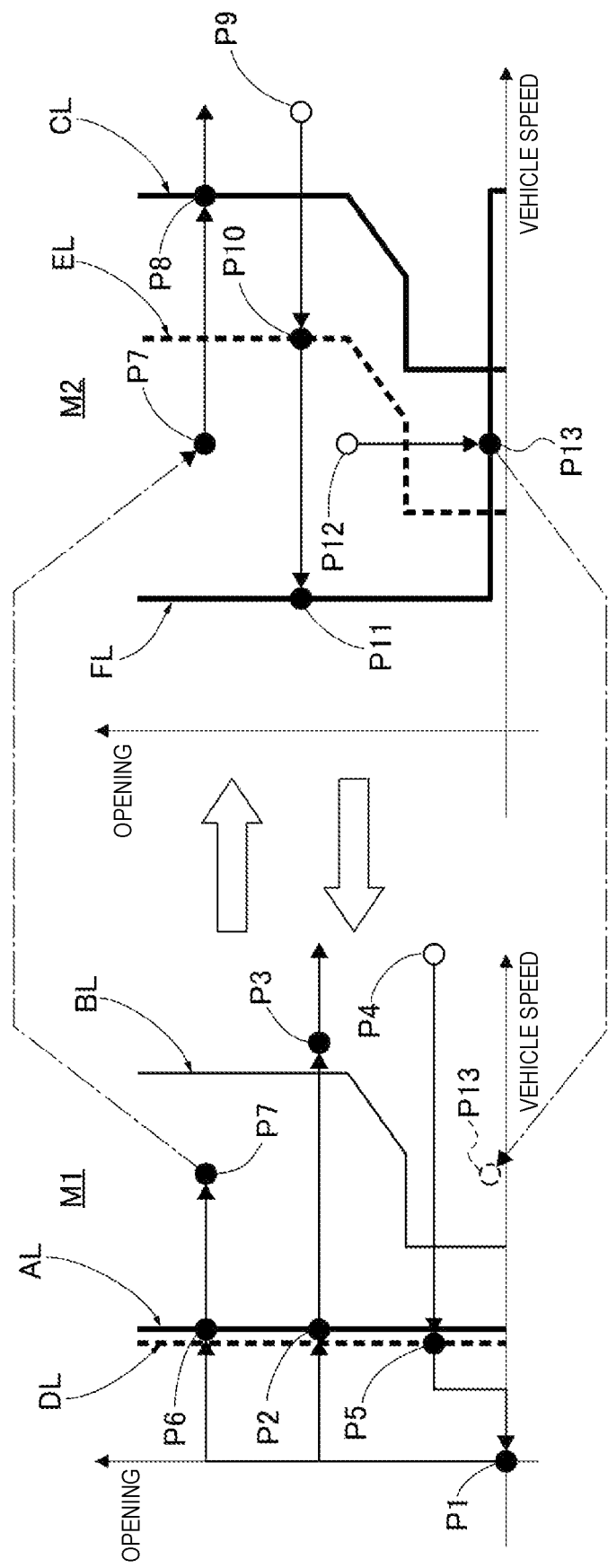
FIG. 11 is an action description diagram showing a switching control action of a lockup map.

Therefore, as shown in FIG. 11, the operating points (VSP, APO) of the first lockup map M1 at the time of starting on a flat road, etc. reaches the operating point P2 according to the first lockup start vehicle speed line AL from the operating point P1 at which the accelerator depression operation is started. After that, when the operating point P3 that exceeds the determination vehicle speed line BL has been reached after the elapse of the predetermined time T due to the acceleration from the operating point P2, the lockup control using the first lockup map M1 is maintained as it is. As shown in FIG. 11, when decelerating and stopping from the operating point P4 according to the lockup engagement state, once the operating point P5 due to the first lockup release vehicle speed line DL is reached, the lockup release command is output, and the process returns to the operating point P1.

On the other hand, when the vehicle speed VSP(t) is smaller than determination vehicle speed B at the time t2 when the predetermined time T has elapsed from the time t1 at which the lockup start instruction is output, it is determined that the travelling resistance is large, and the second lockup map M2 is selected by map-switching.

Therefore, as shown in FIG. 11, the operating points (VSP, APO) of the first lockup map M1 at the time of starting on an ascending road, etc. reaches the operating point P6 according to the first lockup start vehicle speed line AL from the operating point P1 at which the accelerator depression operation is started. After that, when the operating point P7, which does not reach the determination vehicle speed line BL after the elapse of the predetermined time T due to the insufficient acceleration from the operating point P6, has been reached, the second lockup map M2 is selected as the map switching condition is satisfied.

The position of the operating point P7 on the second lockup map M2 is in the lockup disengagement region, and when switching to the second lockup map M2, the lockup engagement command is stopped, and the lockup release command is output. After that, when the operating point P8 according to the second lockup restart vehicle speed line CL is reached due to the increase in vehicle speed from the operating point P7, the lockup engagement command is re-output.

As shown in FIG. 11, when decelerating from the operating point P9 according to the lockup engagement state, once the operating point P10 according to the second lockup release vehicle speed line EL is reached, the lockup release command is output. Then, when the operating point P11 according to the map switching line FL is reached due to the decrease in the vehicle speed, the first lockup map M1 is selected as the map switching condition is satisfied.

Further, when the operating point P12, which does not reach the determination vehicle speed line BL after the elapse of the predetermined time T due to the insufficient acceleration, is reached, the operation change from the accelerator foot release to the depression shall be performed with the intention of re-acceleration. In this case, the operating point P13 according to the map switching line FL is reached according to the low accelerator opening due to the accelerator foot release operation, and the first lockup map M1 is selected as the map switching condition is satisfied. When the operating point P13 shifts to the first lockup map M1, the operating point P13 exists in the lockup engagement region, and the lockup engagement command is immediately output.

In this way, the map selection unit 105 maintains the selection of the first lockup map M1 when the continuation command is input from the lockup engagement continuation unit 102. Then, when the engagement start delay command is input from the lockup engagement start delay unit 103, the second lockup map M2 is selected by map-switching. Therefore, by the selection process of the lockup maps M1, M2, it is possible to suppress the discomfort given to the driver in the start scene where the travelling resistance is large, while maintaining the lockup control according to the first lockup start vehicle speed A of the low vehicle speed range in the start scene where the travelling resistance is small.

The second lockup map M2 has the second lockup release vehicle speed line EL with the same settings as the determination vehicle speed line BL, and the second lockup restart vehicle speed line CL is set to the higher vehicle speed side of the second lockup release vehicle speed line EL by the amount of vehicle speed hysteresis α. Therefore, even when the vehicle speed VSP changes due to a small accelerator releasing operation by the driver, it is possible to prevent control hunting in which lockup engagement and lockup release are repeated.

The second lockup map M2 has the map switching line FL extending to the higher vehicle speed side of the second lockup restart vehicle speed line CL in the coast opening range. During the selection of the second lockup map M2, the map selection unit 105 selects the first lockup map M1 by map-switching when the operating points (VSP, APO) according to the vehicle speed VSP and the accelerator opening APO crosses the map switching line FL due to the accelerator foot release operation. Therefore, it is possible to prevent the driver from feeling uncomfortable when starting from the ascending road, etc. and performing a shift operation from the accelerator foot release to the depression with the intention of re-acceleration. That is, the second lockup restart vehicle speed line CL is set on the higher speed side of the first lockup start vehicle speed line AL, and when the driver intends to accelerate, if the selection of the second lockup map M2 is maintained, the lockup start is delayed, giving the driver the sense of discomfort.

As described above, the lockup control device of the automatic transmission 3 according to the first embodiment has the effects listed below.

(1) In the lockup control device of the automatic transmission 3 provided with the lockup controller 100 which starts the output of the lockup engagement instruction when the vehicle speed reaches the lockup start vehicle speed, under a state where the lockup clutch 2a of the torque converter 2 arranged between the driving source for travelling (engine 1) and transmission mechanism (gear train 3a) is disengaged, the lockup controller 100 includes:

a determination unit (traveling resistance determination unit 101) that determines whether the vehicle speed VSP(t), which is obtained a predetermined time T after the output of the lockup engagement instruction is started due to the vehicle speed VSP becoming the lockup start vehicle speed A, has reached the predetermined determination vehicle speed B;

a lockup engagement continuation unit 102 that continues the output of the lockup engagement instruction when the determination unit (traveling resistance determination unit 101) determines that the vehicle speed VSP(t) has reached the determination vehicle speed B; and a lockup engagement start delay unit 103 that stops the output of the lockup engagement instruction when the determination unit (traveling resistance determination unit 101) determines that the vehicle speed VSP(t) has not reached the determination vehicle speed B, and restarts the output of the lockup engagement instruction when the vehicle speed VSP reaches the lockup restart vehicle speed C which is set to a vehicle speed higher than the lockup start vehicle speed A during the output stop.

Therefore, it is possible to suppress the discomfort given to the driver during the lockup engagement even when the vehicle speed cannot be increased due to, for example, a start scene having a large travelling resistance while maintaining energy consumption reduction performance (fuel saving performance) by the lockup engagement.

(2) The determination unit (traveling resistance determination unit 101) sets the predetermined time T to a time that is the timing immediately before the lockup capacity occurs by the lockup clutch 2a.

Therefore, when it is determined that the vehicle speed VSP(t) has not reached the determination vehicle speed B, the output of the lockup engagement instruction is stopped before the lockup capacity occurs, thereby it is possible to prevent the influence of the occurrence of the lockup capacity.

(3) The determination unit (traveling resistance determination unit 101) sets the determination vehicle speed B to a low vehicle speed value when an accelerator opening is in a low opening range and sets the determination vehicle speed B to a high vehicle speed value when an accelerator opening is in a high opening range with reference to the travelling resistance on a flat road.

Therefore, it is possible to determine whether the vehicle is starting on a flat road or on an ascending road based on whether the vehicle speed VSP(t) has reached the determination vehicle speed B while responding to the difference in acceleration characteristics due to the accelerator opening APO.

(4) The lockup engagement start delay unit 103 sets the lockup restart vehicle speed C to the vehicle speed region value of the determination vehicle speed B.

Therefore, in the case of the large travelling resistance, such as when starting on an ascending road, the vehicle speed VSP is in the vehicle speed range where lockup is desired, and the lockup convergence is possible at the same vehicle speed timing as when the travelling resistance is small at the time of starting on a flat road, etc.

(5) The lockup controller 100 includes: a lockup map setting unit 104 that sets the lockup map based on a two-dimensional coordinate plane of the vehicle speed VSP and the accelerator opening APO, wherein the first lockup map M1 having the first lockup start vehicle speed line AL and the determination vehicle speed line BL for starting the output of the lockup engagement instruction and the second lockup map M2 having the second lockup restart vehicle speed line CL for restarting the output of the lockup engagement instruction are set in the lockup map setting unit 104; and a map selection unit 105 maintains the selection of the first lockup map M1 when the continuation command is input from the lockup engagement continuation unit 102, and selects the second lockup map M2 by map-switching when the engagement start delay command is input from the lockup engagement start delay unit 103.

Therefore, by the selection process of the lockup maps M1, M2, it is possible to suppress the discomfort given to the driver in the start scene where the travelling resistance is large, while maintaining the lockup control according to the first lockup start vehicle speed A of the low vehicle speed range in the start scene where the travelling resistance is small.

(6) The second lockup map M2 includes the second lockup release vehicle speed line EL with the same settings as the determination vehicle speed line BL, wherein the second lockup restart vehicle speed line CL is set to the higher vehicle speed side of the second lockup release vehicle speed line EL by the amount of vehicle speed hysteresis α.

Therefore, even when the vehicle speed VSP changes due to a small accelerator releasing operation by the driver, it is possible to prevent control hunting in which lockup engagement and lockup release are repeated.

(7) The second lockup map M2 has the map switching line FL extending to the higher vehicle speed side of the second lockup restart vehicle speed line CL in the coast opening range, and during the selection of the second lockup map M2, the map selection unit 105 selects the first lockup map M1 by map-switching when the operating points (VSP, APO) according to the vehicle speed VSP and the accelerator opening APO crosses the map switching line FL due to the accelerator foot release operation.

Therefore, it is possible to prevent the driver from feeling uncomfortable when starting on an ascending road, etc. and performing an operation change from an accelerator foot release to a depression with the intention of re-acceleration.

The lockup control device of the automatic transmission according to the embodiment of the present invention has been described above based on the first embodiment. However, a specific configuration is not limited to the embodiment 1, and design change and addition, etc. can be permitted without departing from the gist of the present invention according to the claims within the scope of claims.

In the first embodiment, as the automatic transmission, an example of the automatic transmission 3 having 9 forward gears and 1 reverse gear is shown. However, as the automatic transmission, the example may be an automatic transmission having different speeds other than 9 forward speeds and 1 reverse speed, a continuously variable transmission with an auxiliary transmission that combines a belt continuously variable transmission and a multi-speed transmission, or a belt continuously variable transmission.

In the first embodiment, an example of the lockup control device of the automatic transmission 3 mounted on the engine vehicle whose driving source for travelling is the engine 1 is shown. However, the example can be applied as the lockup control device of the automatic transmission for not only an engine vehicle, but also a hybrid vehicle or an electric vehicle, etc.

In the first embodiment, as the determination unit, an example of the traveling resistance determination unit 101 that determines the travelling resistance is shown. However, the determination unit is not limited to the determination of the travelling resistance, and may also determine the vehicle speed in a manner of determining whether the vehicle speed after the predetermined time has elapsed from the start of the output of the lockup engagement instruction has reached a predetermined determination vehicle speed.

The present application claims a priority under Japanese Patent Application No. 2019-185709 filed to Japan Patent Office on Oct. 9, 2019, and an entire content of this application are incorporated herein by reference.

The invention claimed is:

1. A lockup control device of an automatic transmission, comprising:
a controller programmed to start an output of a lockup engagement instruction when a vehicle speed reaches a lockup start vehicle speed under a state where a lockup clutch of a torque converter arranged between a driving source for travelling and a transmission mechanism is disengaged,
wherein the controller is further programmed to:
determine whether the vehicle speed, which is obtained a predetermined time after the output of the lockup engagement instruction is started due to the vehicle speed becoming the lockup start vehicle speed, has reached a predetermined determination vehicle speed;
continue the output of the lockup engagement instruction when it is determined that the vehicle speed has reached the determination vehicle speed; and
stop the output of the lockup engagement instruction when it is determined that the vehicle speed has not reached the determination vehicle speed, and restart the output of the lockup engagement instruction when the vehicle speed reaches a lockup restart vehicle speed which is set to a vehicle speed higher than the lockup start vehicle speed during stop of the output.

2. The lockup control device of the automatic transmission according to claim 1, wherein:
the controller is further programmed to set the predetermined time to a time that is the timing immediately before a lockup capacity occurs by the lockup clutch.

3. The lockup control device of the automatic transmission according to claim 1, wherein:
the controller is further programmed to set the determination vehicle speed to a low vehicle speed value when an accelerator opening is in a low opening range and set the determination vehicle speed to a high vehicle speed value when the accelerator opening is in a high opening range with reference to a travelling resistance on a flat road.

4. The lockup control device of the automatic transmission according to claim 1, wherein:
the controller is further programmed to set the lockup restart vehicle speed to a vehicle speed region value of the determination vehicle speed.

5. The lockup control device of the automatic transmission according to claim 1, wherein:
the controller is further programmed to:
set a lockup map based on a two-dimensional coordinate plane of the vehicle speed and an accelerator opening;
set a first lockup map having a first lockup start vehicle speed line and a determination vehicle speed line for starting the output of the lockup engagement instruction and a second lockup map having a second lockup restart vehicle speed line for restarting the output of the lockup engagement instruction;
maintain a selection of the first lockup map when there is a continuation command; and
select the second lockup map by map-switching when there is an engagement start delay command.

6. The lockup control device of the automatic transmission according to claim 5, wherein:
the second lockup map has a second lockup release vehicle speed line with the same settings as the determination vehicle speed line, and
the second lockup restart vehicle speed line is set to a higher vehicle speed side of the second lockup release vehicle speed line by an amount of vehicle speed hysteresis.

7. The lockup control device of the automatic transmission according to claim 6, wherein:
the second lockup map has a map switching line extending to a higher vehicle speed side of the second lockup restart vehicle speed line in a coast opening range; and
the controller is further programmed to select the first lockup map by map-switching when an operating point according to the vehicle speed and the accelerator opening crosses the map switching line due to an accelerator foot release operation during the selection of the second lockup map.

8. A lockup control method for an automatic transmission having a lockup clutch of a torque converter arranged between a driving source for travelling and a transmission mechanism, the lockup control method comprising:
starting an output of an engagement instruction of the lockup clutch when a vehicle speed becomes a lockup start vehicle speed under a state where the lockup clutch is disengaged;
when the vehicle speed, which is obtained a predetermined time after the output of the engagement instruction is started due to the vehicle speed becoming the lockup start vehicle speed, has reached a predetermined vehicle speed, continuing the output of the engagement instruction; and when the vehicle speed has not reached the predetermined vehicle speed, stopping the output of the engagement instruction and restarting the output of the engagement instruction when the vehicle speed reaches a lockup restart vehicle speed which is set to a vehicle speed higher than the lockup start vehicle speed while the output is stopped.

9. A lockup control device of an automatic transmission having a lockup clutch of a torque converter arranged between a driving source for travelling and a transmission mechanism, comprising:

a controller programmed to:

start an output of an engagement instruction of the lockup clutch when a vehicle speed becomes a lockup start vehicle speed under a state where the lockup clutch is disengaged;

when the vehicle speed, which is obtained a predetermined time after the output of the engagement instruction is started due to the vehicle speed becoming the lockup start vehicle speed, has reached a predetermined vehicle speed, continue the output of the engagement instruction; and when the vehicle speed has not reached the predetermined vehicle speed, stop the output of the engagement instruction and restart the output of the engagement instruction when the vehicle speed reaches a lockup restart vehicle speed which is set to a vehicle speed higher than the lockup start vehicle speed while the output is stopped.

10. The lockup control device of the automatic transmission according to claim 9, wherein:

the controller is further programmed to set the predetermined time to a time that is the timing immediately before a lockup capacity occurs by the lockup clutch.

11. The lockup control device of the automatic transmission according to claim 9, wherein:

the controller is further programmed to set the predetermined vehicle speed to a low vehicle speed value when an accelerator opening is in a low opening range and set the predetermined vehicle speed to a high vehicle speed value when the accelerator opening is in a high opening range with reference to a travelling resistance on a flat road.

12. The lockup control device of the automatic transmission according to claim 9, wherein:

the controller is further programmed to set the lockup restart vehicle speed to a vehicle speed region value of the predetermined vehicle speed.

\* \* \* \* \*